Jan. 9, 1968   R. J. SMULAND   3,362,681
TURBINE COOLING
Filed Aug. 24, 1966   3 Sheets-Sheet 1
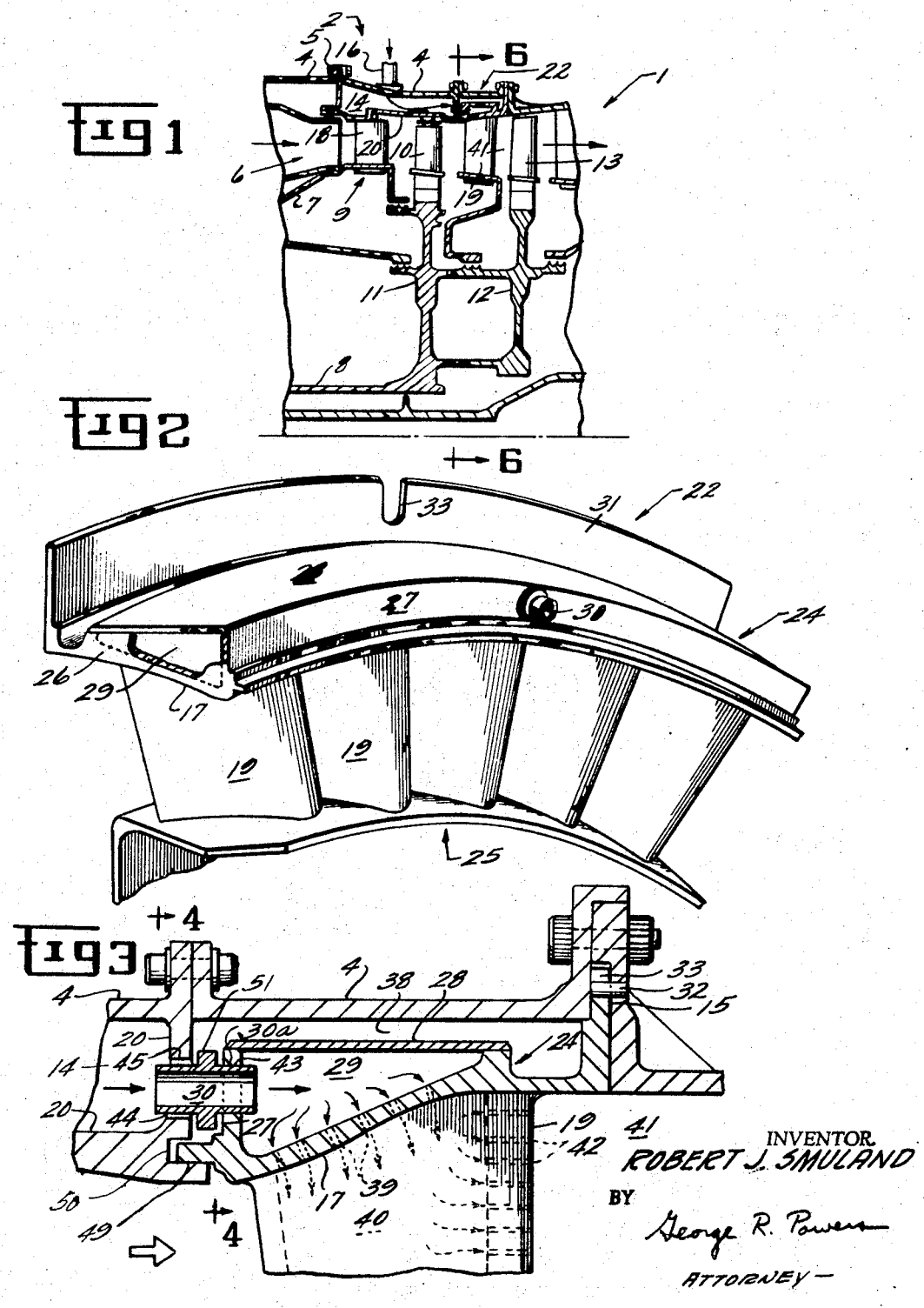
INVENTOR.
ROBERT J. SMULAND
BY
George R. Powers
ATTORNEY

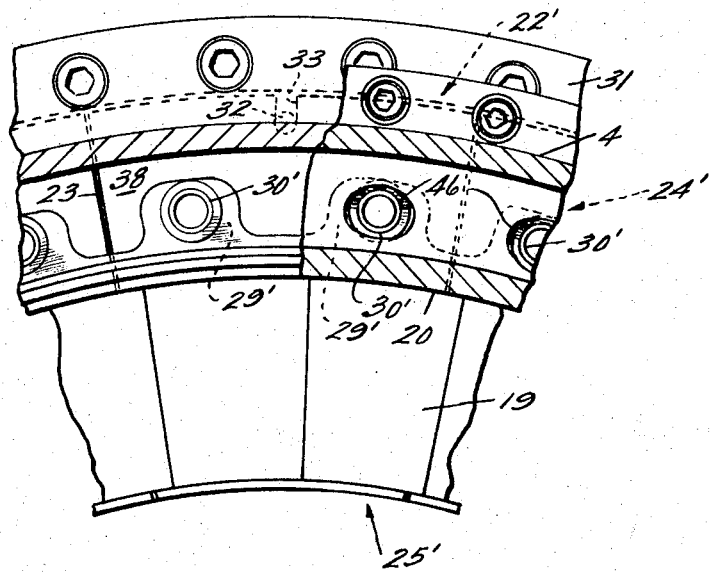
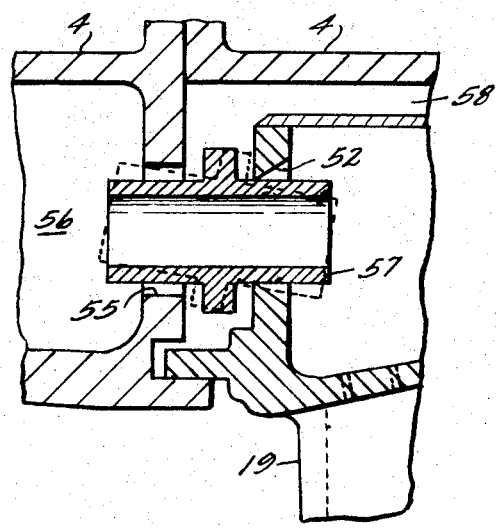

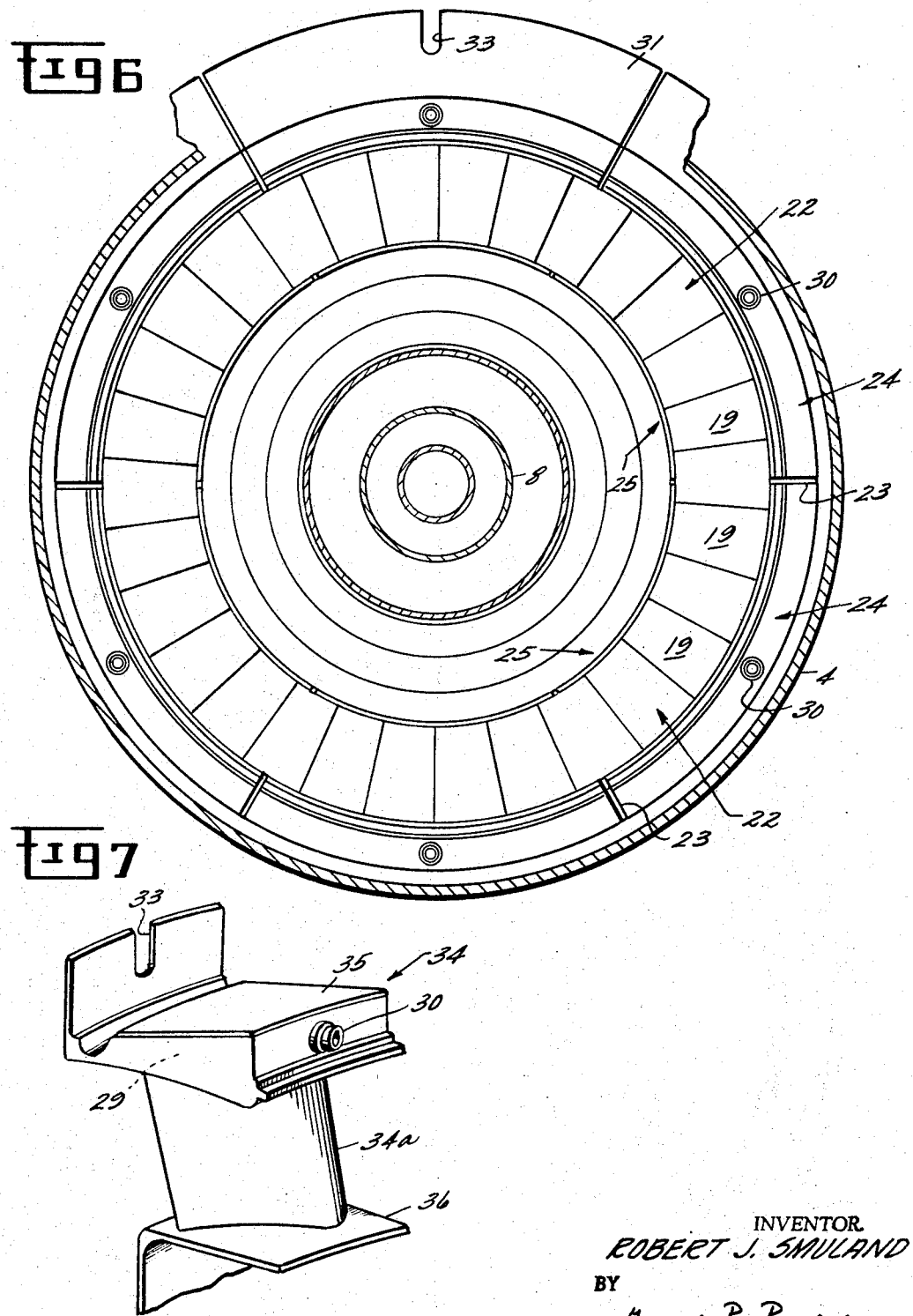

United States Patent Office 3,362,681
Patented Jan. 9, 1968

3,362,681
TURBINE COOLING
Robert J. Smuland, Melrose, Mass., assignor to General
Electric Company, a corporation of New York
Filed Aug. 24, 1966, Ser. No. 574,681
9 Claims. (Cl. 253—39.1)

ABSTRACT OF THE DISCLOSURE

A stator assembly of a high temperature rotary machine includes a segmented ring of vane support bases having gaps therebetween and means for supplying high pressure cooling fluid to chambers within the support bases, the supply means permitting a limited amount only of cooling fluid to flow to the gaps between the support bases.

---

The invention relates to stator assemblies for axial flow fluid machines such as turbines or compressors of gas turbine engines, and more particularly to means for ducting cooling air without high leakage to a stator nozzle composed of a plurality of segments.

It is well known that the efficiency of a gas turbine engine is related to the operating temperature of the turbine and that the efficiency may be raised by increasing the operating temperature. As a practical matter, however, the maximum turbine operating temperature is limited by the high temperature capabilities of the various turbine elements. Since the engine efficiency is thus limited by temperature considerations, turbine designers have expended considerable effort toward increasing the high temperature capabilities of turbine elements.

Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements for vanes have been devised for extending the upper operating temperatures limit by keeping the vane material at the lower temperatures which it is capable of withstanding without oxidation or burning out. As used herein, the term "vane" is a generic term referring to airfoil-shaped elements used in high temperature turbomachines. As such, the term applies not only to those members popularly known as vanes, but also to other airfoil shaped members commonly known as blades, buckets, etc. The present invention is particularly illustrated herein in conjunction with the airfoil shaped vanes of a turbine.

Cooling of vanes is generally accomplished by providing internal flow passages within the vanes to accommodate the flow of a cooling fluid, the fluid typically being compressed air bled from either the compressor or the combustor. It is also well known that the engine efficiency theoretically possible is reduced by thus extracting cooling air.

In certain turbine constructions engine efficiency is also lost in the delivery of the cooling fluid to the vanes. In high temperature gas turbines, it has been found that the turbine stator or nozzle is subjected to large variations in local temperature by the engine gas stream. Turbine designers have discovered that one means of combatting this problem has been to construct turbine nozzles of many individual segments so that a gap for accommodating the high thermal stresses is provided between adjacent segments. However, a difficulty experienced with this construction is that the gaps so provided become passageways through which cooling fluid being delivered to the vanes leaks into the relatively hot turbine gas stream. The leakage thus resulting is substantial and contributes to lower turbine efficiency. On the other hand, some cooling of the vane supporting structure of the stator assembly is desirable, and it has been found that unless some cooling fluid is maintained in the gaps between segments, leakage of hot gases from the engine gas stream will result, thereby contributing to reduced engine efficiency.

The cooling system must also be efficient from the standpoint of minimizing the quantity of cooling fluid required, lest the decrease in efficiency caused by the extraction of the air be greater than the increase resulting from the higher turbine operating temperature.

It is an object of this invention to provide an improved stator assembly for a high gas turbine engine in which cooling fluid is utilized in a highly efficient manner.

It is another object of this invention to maintain a low stress segmented turbine stator construction in which the vanes are effectively cooled with only low coolant and engine efficiency losses.

It is yet another object of this invention to provide a stator assembly in which cooling fluid is ducted to stator vanes without high leakage through the gaps incorporated in a segmented stator assembly design.

It is still another object of this invention to provide limiting means in the ducting of cooling fluid to the vanes so that in the event of vane failure excessive leakage will not occur.

It is also another object of this invention to provide cooling fluid to stator vanes without imposing loads or impairing the inherently low stress segmented construction of the stator assembly.

It is a further object of this invention to provide a stator vane support segment which is capable of absorbing loads and stresses independent of the cooling system.

In brief, and in one form of the invention, a fluid cooled stator assembly is provided with a plurality of circumferentially spaced radially extending vanes having base portions forming an outer segmented ring. Each of the base portions includes a chamber formed therein having an inlet for receiving cooling fluid from supply means and outlet means connected to fluid passageways in the vanes. A barrier means is provided for preventing flow of the cooling fluid directly to the gaps between the ring segments from the supply means. A tube or conduit connects the cooling fluild supply directly to the chamber in the base portion through mating holes in the barrier means and the base portion. The cooling air enters the chamber through the tube and is then fed through the outlet means in the chamber to the passageways in the vanes, thus avoiding high leakage through the gaps between segments.

A further aspect of the invention involves fitting one end of the tube tightly into one of the mating holes while its other end is fitted in the other mating hole more loosely so as to thereby provide a clearance. A primary benefit derived from the loose fit is that a desirable limited amount of cooling fluid may be bypassed through the clearance to cool the exterior surfaces of the base portions of the outer segmented ring, and to purge the space formed between casing means and outer ring of hot gases which might otherwise leak from the main engine flow. A limited amount of leakage thus provided for enhances engine efficiency. In other words, the size of the clearance is determined by the amount of leakage desired.

By still further aspects of the invention, the tube extending through the mating holes in the barrier means and the base portion is disposed axially such that the loose fit will allow unrestrained axial thermal growth between the base portion and the barrier means during turbomachine operation. Furthermore, in the event that the mating holes are disposed such that relative movement, other than axial movement, is likely to occur therebetween during operation, the mating holes may be shaped to accommodate this movement in a stress free manner while still maintaining a desired clearance in accordance with the leakage requirements.

The subject matter which I regard as my invention is particularly pointed out and distinctly claimed in the concluding portion of this specification. The invention, however, both as to organization and content, will be best understood and appreciated, along with other objects and features thereof, from the following detailed description taken in conjunction with the accompanying drawings in which:

FIG. 1 is a sectional view of a portion of a gas turbine engine incorporating the stator assembly of the present invention;

FIG. 2 is a perspective view of a segment of the plural vaned stator assembly;

FIG. 3 is a sectional view of a portion of the assembly of FIG. 1 showing cooling apparatus of the stator assembly;

FIG. 4 is a sectional view taken along line 4—4 of FIG. 3 showing an alternative form of the invention;

FIG. 5 is a sectional view similar to FIG. 3 showing an alternative form of the invention;

FIG. 6 is a cross-sectional view taken along the line 6—6 of FIG. 1 and further illustrating the stator assembly; and FIG. 7 is a perspective view of a stator assembly segment illustrating an alternative form of the invention.

Referring to the drawings, and particularly ot FIG. 1, a portion of a high temperature axial flow gas turbine engine 1 is illustrated, the engine having an outer cylindrical casing 2, including annular sections 3 and 4 secured together by suitable fastening means at an annular flange connection 5. An annular combustor indicated generally at 6 is positioned between the casing section 3 and an inner annular casing 7. The combustor 6 is fed continuously with high pressure air during engine operation by a compressor (not shown) located in the engine 1 forwardly of the combustor 6. The compressor is driven by the annular shaft 8 and, as is well known in turbine engines, it takes in air at atmosphere pressure and compresses it to a pressure of several atmospheres depending upon the engine cycle. Fuel is mixed with the high pressure air in the combustor and the hot gases of combustion are exhausted out the downstream end of the combustor.

An annular diaphragm indicated generally by 9 in FIG. 1 is located at the downstream end of the combustor for directing the hot products of combustion to a row of turbine rotor vanes, or buckets, 10 at the proper velocity and at the proper angle. The turbine buckets 10 are peripherally mounted on a turbine wheel 11 which, along with its associated shaft 8 and a second turbine wheel 12 having buckets 13 mounted thereon, is rotatably mounted within the engine 1 by suitable mounting means not shown. The turbine unit comprising wheels 11 and 12 and shaft 8 drives the compressor of engine 1 as mentioned above.

The casing section 4 has an annular manifold 14 therein for receiving cooling air bled from the compressor through duct 16. The cooling air received by the manifold is directed through the interiors of the vanes 18 comprising the first stage nozzle diaphragm 9 and through the second stage stator vanes 19 as shown. The cooling air received by manifold 14 is separated from the second stage stator vanes 19 by a circumferentially continuous barrier means 20 of casing section 4 in accordance with the teaching of this invention.

Referring to the cross section of the engine shown on FIG. 6, a stator ring indicated generally by 21 in FIG. 6 is composed of a plurality of arcuate segments 22 separated by gaps 23. A perspective illustration of an arcuate segment 22 is shown in FIG. 2. A plurality of vanes 19 are supported on their outer peripheries on each segment 22 by an arcuate base portion generally indicated as 24 and on their inner peripheries by arcuate support member 25. The base portion 24 has a chamber 29 formed therein defined by walls 26, 27, 28, and 17.

For introducing cooling air to the vanes 19, chamber inlet conduit 30 extends through the side front wall 27 and interconnects the chamber 29 with the source of cooling fluid in the manifold 14. Flange member 31 of the base portion 24 includes at the center of the segment 22 a slot 33 which cooperates with a pin 32 as shown by FIG. 3, for locating the center of the segment 22 in a fixed position, the ends of the segment being free to expand and contract circumferentially with respect to the fixed center within a groove 15 formed between the casing flanges.

An alternative embodiment of the arcuate segment indicated as 34 is illustrated in FIG. 7. In this embodiment a single vane 34a is supported on each segment 34 by base portion 35 and inner support member 36.

Turning now to FIG. 3 further details of the subject invention are shown. Casing section 4 is provided with a cricumferentially continuous, unsegmented wall 20 which serves as a barrier means between the cooling air manifold 14 and the space 38 formed between casing section 4 and the base portion 24 of the segment. This wall or barrier means 20 will prevent high leakage of the cooling air (or other cooling fluid) through gaps 23, as shown in FIG. 6, from occurring. Specifically, the barrier means prevent any rapid leakage of cooling air into the space 38 between the casing section 4 and the base portions 24 and thus avoid substantial leakage into the gaps 23 which connect with the space 38. Cooling air is directed, as shown, through a tube or conduit 30 which connects manifold 14 with chamber 29, the tube 30 being received in mating passages or holes 45 and 30a in the barrier wall 20 and the segment front wall 27. Outlet means 39 connects the supply of cooling air in the chamber 29 with passageway 40 in the vanes 19. The cooling fluid flows through the passageway 40 and thence into the main flow of hot gases 41 of the engine. In the illustrated embodiment, the cooling air leaves the vanes through trailing edge holes 42 in the vane 19, thereby being conserved. In the event that one or more of the vanes 19 should become damaged such that the outlet means 39 and the trailing edge holes 42 do not properly meter the flow of cooling fluid, the limited flow area of the tube 30 will prevent greatly excessive flow and accompanying losses in engine efficiency.

The conduit 30 is provided with a tight fit 43 in the chamber opening 30a and a looser fit through the opening 45 in the barrier means 20. The loose fit is accomplished by providing a predetermined clearance 44 between the outer surface of the conduit and the circular opening 45 in the barrier means. The primary function of the clearance 44 is to provide a passageway for a limited amount of cooling fluid to enter the space 38 to cool the base portion structure outside the chamber 29 and to purge the space 38 of any hot gases which might otherwise leak from the main flow of the engine through the gaps 23. This limited amount of cooling fluid will join the main engine flow by passing through gaps 23. The size of the clearance is designed to permit sufficient, but not excessive, flow of cooling air to accomplish the desired cooling and purging functions. In addition, the loose clearance will, in cooperation with a rabbet 49 provided on the base portion 24 for sliding fit engagement with a recess 50 formed in a portion of the barrier wall 20, permit relative axial thermal growth between the segment 22 and the casing section 4, including the barrier means 20. A flange 51 is provided on the tube 30 to maintain the tube in position at all times.

In the arrangements of FIGS. 2 and 7, a single tube or conduit 30 supplies cooling fluid to the single chamber 29, the tube 30 in each case being located in circumferential alignment with the mounting slot 33. Accordingly, since the slot 33 is positioned in a fixed position, there will be little if any relative circumferential movement during operation between the mating openings in which the tube 30 is received. If, however, a single segment 22' has a plurality of chambers 29' supplied by a plurality of tubes 30' as illustrated by FIG. 4, it will be appreciated that there will ordinarily be some relative circumferential movement between the mating openings since only the portion of the segment containing the slot 33 will remain in a fixed position during operation. To provide for this relative circumferential movement, the openings 46 in the barrier wall 20 may be formed as elongated slots, preferably being elliptically shaped as shown. The total clearance area between the openings 46 and the associated tubes 30 should, of course, be sized in the manner discussed above to provide the desired amount of leakage.

In the event that the elliptically shaped openings 46 of the embodiment illustrated by FIG. 4 do not provide sufficient relative movement between the segments and the barrier wall, the alternate form of conduit mounting illustrated by FIG. 5 may be utilized. The passage 52 in the chamber 54 is in the form of a truncated cone, the smaller end of the opening being located toward the cooling air manifold 56. The conduit 57 is tightly fitted into the opening 52 in the chamber and more loosely fitted in the opening 55 of the barrier means to allow a limited amount of cooling fluid to enter space 58 for reasons discussed above, the opening 55 having either a circular or elliptical shape. By forming the opening 52 as shown in FIG. 5 the bearing area contacting the conduit 57 is reduced and the conduit is free to pivot on the edge of the inlet opening when thermal growth occurs. Bending of the conduit is thus avoided and relative movement between the segment and the barrier means is accommodated. To provide even more freedom of movement, the opening 55 may also be provided with a chamfered surface.

Various other alternatives will, of course, occur to those skilled in the art. For example, in each embodiment, the clearance for permitting controlled leakage has been provided between the tube and the opening in the barrier means. The same end result could be accomplished by providing a tight fit between the tube and the opening in the barrier means and a loose fit between the tube and the opening to the chamber. In such a case, controlled leakage will occur out of the chamber into the space surrounding the base portions.

The operation of the apparatus of this invention will now be described with particular reference to the arrangement illustrated by FIGS. 1-3 and 6. In operation, cooling air bled from the compressor entering manifold 14 is separated by barrier means 20 from the space 38 formed between casing 4 and base portion 24 and thus from the gaps 23 between adjacent segments 22. Wasteful leakage of the cooling air is avoided due the separation. Cooling air from manifold 14 is permitted to enter chamber 29 and the cooling passage 40 in the vane 19 directly through conduit 30 connecting manifold 14 through the barrier means 20 to the chamber 29. Having cooled the vane 19 the cooling air then passes through trailing edge holes 42 in the vane and from there into the main engine flow.

A limited amount of cooling air is permitted to enter the space 38 through clearance 44 between the conduit surface and the barrier means 20. This limited flow cools the base portion 24 of the segment 22 outside the chamber 29. This limited amount of cooling air serves also as purging means, preventing hot gases from the main engine flow from leaking through gaps 23 into the space 38.

It will be understood that while the invention has been discussed in particular with the cooling of vanes in the second stage of the turbine it can also be used with other stages.

While the invention has been described in connection with turbine vanes exposed to high temperature environments, it is also applicable to compressor inlet guide vanes. To counteract an icing condition on an inlet guide vane, a heating fluid such as compressor bleed air may be passed through the vane in the manner taught by this invention.

It should also be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and desired to be secured by Letters Patent of the United Sates is:

1. A fluid cooled stator assembly for use in an axial flow rotary machine comprising:
   a segmented ring of vane support bases,
   at least one vane mounted on each support base and having a cooling fluid passageway therein,
   each of said bases including a closed chamber having an inlet for receiving cooling fluid and outlet means connected to the passageway in the associated vane,
   means for supplying high pressure cooling fluid to said assembly,
   barrier means mounted between said segmented ring and said high pressure cooling fluid supply means for restricting leakage of cooling fluid from said supply means through the gaps between adjacent vane support bases,
   a first passage in said barrier means and a second passage aligned with said first passage in said support base,
   and a conduit received in said first and second passages for introducing cooling fluid from said supply means directly to said chamber in said base,
   one of said passages being dimensioned to provide clearance around said conduit so as to thereby permit the flow of a limited amount of cooling fluid to the gaps between adjacent vane support bases and the other of said passages tightly engaging said conduit to prevent leakage therebetween,
   the clearance between said conduit and said one passage allowing thermal growth of said assembly without creating stresses between said segmented ring and said barrier means.

2. A fluid cooled stator assembly as defined by claim 1 in which said conduit is tightly fitted on the passage in said support base and is loosely received in the passage in said barrier means, said barrier means comprising a portion of the casing of the axial flow rotary machine.

3. A fluid cooled stator assembly as defined by claim 1 wherein the clearance around said conduit permits stress free axial growth of said support base relative to said barrier means.

4. A fluid cooled stator assembly as defined by claim 3 in which at least the passage tightly engaging said conduit is in the form of a truncated cone such that said conduit may pivot within said passage upon thermal growth of said assembly.

5. A fluid cooled stator assembly as defined by claim 3 in which said conduit is disposed in the axial direction of said assembly.

6. A fluid cooled stator assembly as defined by claim 2 wherein said segmented ring of vane support bases constitutes an outer peripheral vane support means, said vanes having additional support means which form an inner support rim.

7. A fluid cooled stator assembly as defined by claim 6, wherein said gaps from exhaust passages for the limited amount of cooling fluid introduced into the space between the casing means and the support bases for purging said space.

8. A fluid cooled stator assembly as defined by claim 7 wherein said opening in the casing means is elongated in the circumferential direction of said assembly.

9. A fluid cooled stator assembly as defined by claim 8 in which said conduit is disposed in the axial direction of said assembly.

References Cited

UNITED STATES PATENTS 2,741,455  4/1956  Hunter.
2,978,168  4/1961  Haworth _____ 253—39.15 X

FOREIGN PATENTS 872,697  4/1953  Germany.
1,038,343  9/1958  Germany.

EVERETTE A. POWELL, Jr., *Primary Examiner.*